Nov. 26, 1929.  W. J. SOVEREIGN  1,736,985
BRAKE
Filed May 7, 1928  2 Sheets-Sheet 1

Inventor
William J. Sovereign.
By Frank C. Earman.
Attorney

Nov. 26, 1929.  W. J. SOVEREIGN  1,736,985
BRAKE
Filed May 7, 1928   2 Sheets-Sheet 2
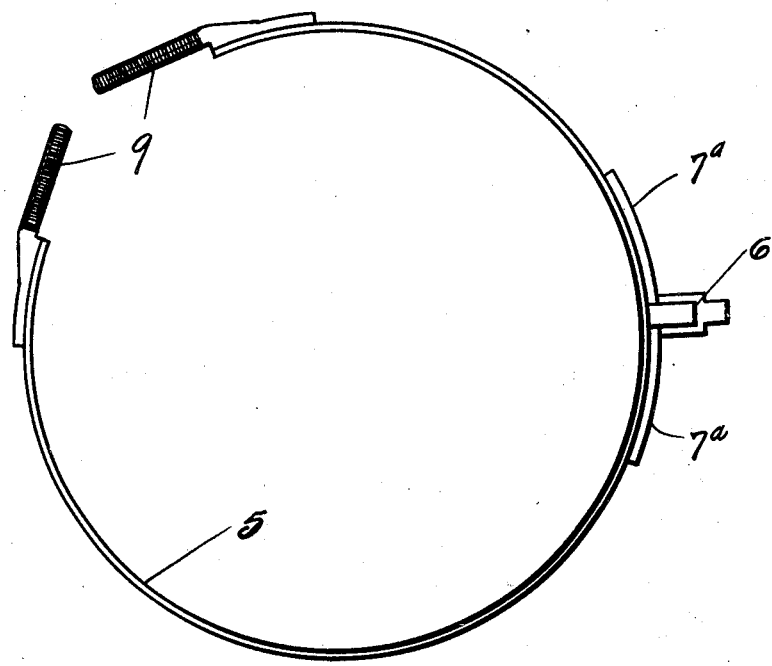
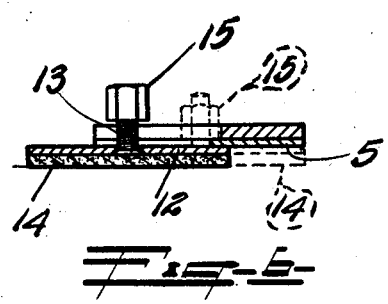
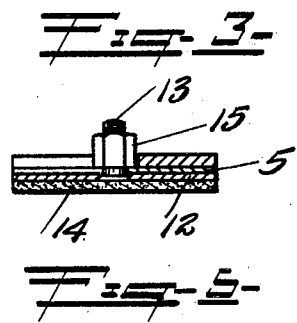
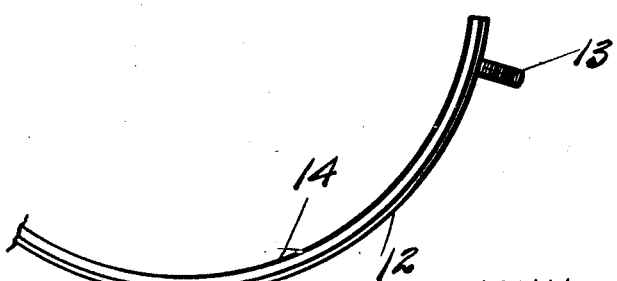
Inventor
William J. Sovereign
By Frank C. Fearman
Attorney Patented Nov. 26, 1929

1,736,985

UNITED STATES PATENT OFFICE

WILLIAM J. SOVEREIGN, OF BAY CITY, MICHIGAN

BRAKE

Application filed May 7, 1928. Serial No. 275,639.

This invention relates to brakes, and particularly to brakes such as used on automotive vehicles.

One object of the invention is to provide a brake having a quickly detachable lining which can be quickly and easily removed and a new lining inserted without dismantling the brake assembly, or removing of the vehicles wheels.

Another object is to design a brake lining which is removable laterally from the brake drum and band, and which is applicable to either the contracting or expanding type of brake construction.

A further object is to design new and novel means for detachably securing the brake lining to the brake band, and which can be applied or removed by unskilled labor with a minimum of time and labor.

With the above and other objects in view, the present invention consists in the combination and arrangement of parts, hereinafter more fully described, illustrated in the accompanying drawings, and particularly pointed out in the appended claims, it being understood that changes may be made in the form, size, proportion, and minor details of construction, without departing from the spirit, or sacrificing any of the advantages of the invention.

In the drawings—

Fig. 3 is a detail edge view of the brake band proper.

Fig. 4 is a fragmentary edge view of the brake lining.

Fig. 5 is a transverse sectional view through the brake.

Fig. 6 is a similar view, illustrating the removal of the lining.

Figure 1:
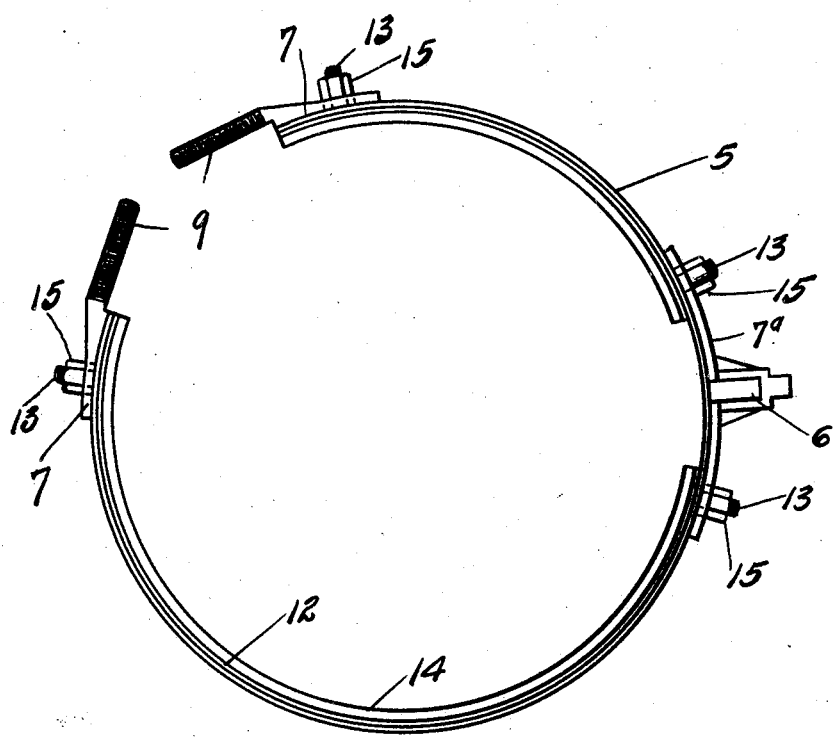
Fig. 1 is an edge view of a brake constructed in accordance with my invention.
Figure 2:
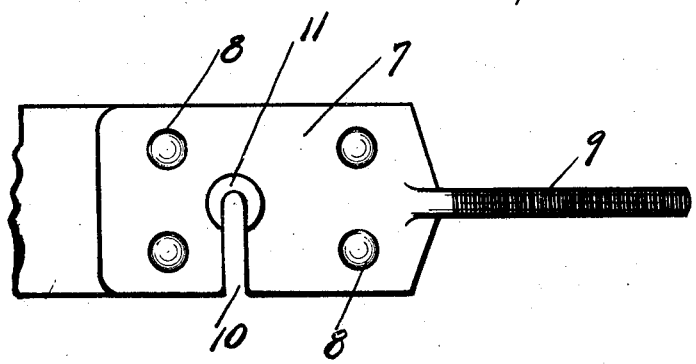
Fig. 2 is an enlarged fragmentary front view of one end of the band.

With the conventional brake construction used on automotive vehicles in general, the relining is a somewhat expensive operation, primarily due to the fact that the wheels must be removed, and the brake assembly entirely disassembled, including the removal of the rivets which hold the brake lining in place, and the riveting of a new brake lining on the band, the major portion of this expense represents the mechanic's time, and I have therefore designed a brake from which the lining can be easily and quickly removed when worn, and which requires no skilled mechanic or tools, other than a wrench and screw driver or similar instrument.

Referring now to the drawings, the numeral 5 indicates a convention brake band having a hanger 6 riveted thereto intermediate its length for supporting the brake relative to the drum on an automobile. Lugs 7 are rigidly secured to the separated ends by means of rivets 8 or the like, and threaded bolt sections 9 are formed integral therewith, and are moved relative to each other by suitable brake actuating mechanism, similar lugs $7^a$ being riveted to the band adjacent the hanger as shown.

Transversely disposed passages 10 are formed in this band, preferably at the points where the lugs 7 and $7^a$ are secured, the passages being also formed in the lugs and terminate in enlarged centrally disposed counter-sunk openings 11 for a purpose to be presently described.

The brake backing consists of thin metallic strips or liners 12, having centrally disposed threaded bolts 13 securely mounted therein and projecting therefrom, the brake lining 14 being riveted to said strips. These liners are adapted to fit the inner surface of the brake band and are moved edgewise into position when assembling, the bolts 13 being accommodated in the passages 10, and when the liners are in proper position, nuts 15, are threaded on the bolts 13, the ends of the nuts projecting and being seated in the counter-sunk openings 11, holding the liners securely in position, and no displacement can occur until the nut has been uscrewed and is clear of the countersunk opening, when the liners can be removed by shifting them edgewise as shown in Fig. 6. of the drawing.

This construction will permit of brake liners being manufactured in proper sizes and dispensed by accessory stores and garages, no skilled mechanic is necessary, to remove or replace, and relining can be easily and quickly accomplished without removal of the vehicle wheels, and while in the present instance I have shown the lining in two sections it will be clearly obvious that any desired number may be provided.

From the foregoing description it will be obvious that I have perfected a very simple, substantial, and inexpensive brake for automotive vehicles, from which the lining can be easily and quickly removed or replaced.

What I claim is:—

1. A brake comprising a band, passages in said band and terminating in countersunk openings, brake liners having detachable engagement with said band, and provided with bolts adapted to travel in said passages, and nuts projecting into said countersunk openings.

2. A brake comprising a band, passages in said band and terminating in countersunk openings, liners detachably engaging said band and provided with bolts adapted to project through said countersunk opening, and nuts engaging said bolts and seating in said countersunk openings when assembled.

3. A brake comprising a band provided with laterally disposed passages, liners detachably secured thereto and provided with bolts adapted to travel in such passages to permit the liners being shifted edgewise and out of engagement in the band, and nuts engaging said bolts for holding the liners in position.

In testimony whereof I hereunto affix my signature.

WILLIAM J. SOVEREIGN.